United States Patent Office 3,294,547
Patented Dec. 27, 1966

3,294,547
LOW MOISTURE CONTENT PASTRY DOUGH COMPOSITIONS
John A. Kooistra, Jr., Forest Park, Ohio, assignor to The Procter & Gamble Company, Cincinnati, Ohio, a corporation of Ohio
No Drawing. Filed Mar. 12, 1964, Ser. No. 351,516
4 Claims. (Cl. 99—92)

This invention is concerned with low moisture content dough and, specifically, with low moisture content doughs having improved handling and keeping characteristics. Low moisture content refers to those dough compositions having from about 10% to about 25% water content by weight. The basic ingredients of the doughs in which this invention finds utility include water, flour and shortening.

Low moisture content doughs are primarily used for the preparaton of pastries such as pie shells. However, the handling characteristics of such doughs have long been recognized as somewhat delicate; if the doughs are subjected to extensive handling in their praparation they tend to crumble and lose strength under repeated handling and rolling out. This is in contrast to higher moisture content doughs such as ravioli dough and bread dough which can be rolled out, kneaded and/or shaped several times prior to baking. Overly handled doughs must be discarded, resulting in wasted materials, loss of time and general inconvenience in both commercial baking establishments and in home kitchens.

An additional problem encountered with low moisture content doughs is that they cannot be kept for extended periods of time without spoilage. Spoilage appears to be directly related to the available water in the dough composition. Higher moisture content doughs tend to spoil more rapidly than those of low moisture content. However, spoilage occurs in low moisture content doughs too, and storage for more than 4 to 14 days is generally not recommended.

It is an object of this invention to provide low moisture content doughs which can be subjected to repeated and extensive handling without crumbling and general loss of strength.

It is a further object of this invention to provide low moisture content doughs which have extended keeping and storage characteristics.

It is a particular object of this invention to provide low moisture content doughs which have both improved handling and improved storage characteristics.

The above objects are realized in the present invention in a dough composition which consists essentially of from about 40% to about 55% flour, about 10% to about 25% water, about 20% to about 35% shortening and about 1% to about 15% glycerol, the glycerol to water ratio being from about 1:9 to about 3:2. Especially desirable results are noted in dough compositions containing about 45% to about 50% flour, about 14% to about 18% water, about 29% to about 35% shortening, and about 1% to about 5% glycerol. All percentages used herein are by weight of the dough composition. Doughs of these compositions are excellent pastry doughs, particularly, pie doughs, which have superior "sheet strength," and are capable of prolonged storage without spoilage. "Sheet strength" refers to the ability of a dough to hold together under repeated handling and rolling out.

Although several ingredients comprise the dough composition of this invention, the unique handling and storage characteristics of the dough are attributable to the presence of glycerol in the composition. The mechanism by which increased sheet strength is imparted to the dough is not known. With regard to microbial stability, it is believed that substitution of glycerol for some of the water in low moisture content dough systems either lowers the available moisture to levels where microbial growth does not occur or to levels where microbial spoilage can be controlled for extended periods of time by customary methods such as refrigeration, anaerobiosis (removal of oxygen), pH control, added electrolytes or use of edible preservatives.

A wide variety of storage and handling chacteristics can be realized by varying the percent glycerol in the dough. With glycerol content as high as 5%–15% by weight of the mixture, sheet strength and storage life are substantially increased. However, browning of the dough on baking also increases with higher glycerol concentrations, and individual preferences may dictate a lower glycerol concentration if lighter crust color is desired in the final baked product.

Flours suitable for use in the practice of this invention include those commonly used for pastry doughs. All-purpose flours and unbleached pastry flours are quite satisfactory and bread and cake flours can also be used.

Suitable shortenings can be selected from either the liquid or plastic type shortenings derived from vegetable oils such as soybean or cottonseed oil and from animal fats such as lard. Examples of suitable shortenings are disclosed in U.S. Patent 2,815,286, U.S. Patent 2,442,537, and U.S. Patent 2,801,177. One suitable commercially available shortening is Crisco shortening (a plastic vegetable oil shortening). The shortenings can contain dissolved and suspended emulsifiers such as mono- and diglycerides and lactylated glyceride emulsifiers; they can also contain other additives designed to improve cooking qualities. In general, those shortenings customarily used in the pastry field are suitable for use in the dough compositions of this invention.

Sodium chloride is a common minor ingredient of the dough compositions of this invention. The principal function of sodium chloride is as a flavoring agent and amounts used can be varied according to individual tastes.

Edible preservatives also can be included in the dough in amounts ranging from about .03% to about .3% by weight. The presence of both glycerol and a preservative results in doughs which can be stored without spoilage for very long periods of time (e.g. six months). Suitable edible preservatives include calcium propionate, propionic acid, sorbic acid, potassium sorbate and sodium benzoate.

A wide variety of other additives can be incorporated in the dough compositions of this invention. Albumin is frequently added in pastry doughs to prevent soggy crust bottoms in pie pans. Numerous flavoring substances are also used in pie doughs, cookie doughs and pastry doughs in general.

A variety of methods can be used for preparing the doughs of this invention. One convenient method of formulation involves premixing water and glycerol in a mechanical mixer such as a Hobart mixer for about 2 minutes at 70 revolutions per minute. Usin ga similar mixing technique flour and sodium chloride are intermixed until the sodium chloride is evenly distributed in the flour. Shortening is added to the flour-sodium chloride mixture and blended until small balls, approximately ¾ inch in diameter, are formed. The water-glycerol mixture is then added to the flour-sodium chloride-shortening mixture and mixing is continued until the dough state is reached. This dough can be stored without spoilage for extended periods (e.g. 20–30 days at 50° F. to 80° F.) until it is to be used. If edible preservatives are also included in the composition storage without spoilage can be greatly prolonged. The dough also retains desirable improved handling characteristics and sheet strength after prolonged storage.

Applications of the above-described invention can be illustrated by use of the following examples. However, these examples are not intended to be limiting in any respect, and variations will be apparent to those skilled in the baking arts.

EXAMPLE 1

A dough composition was prepared having the following ingredients:

| | Percent (by weight) |
|---|---|
| Wheat flour | 49.15 |
| Shortening (Crisco) | 29.45 |
| Water | 17.00 |
| Glycerol | 3.00 |
| Sodium chloride | 1.40 |

Water and glycerol were first premixed in a Hobart mixer by mixing at 70 revolutions per minute for 2 minutes. The flour and sodium chloride were also intermixed in the same manner until the sodium chloride was evenly distributed in the flour; the shortening was then added to the flour-sodium chloride mixture and also mixed in a Hobart mixer until small ball-like lumps were formed. The water-glycerol mixture was then added to the flour-shortening-sodium chloride mixture and mixing was continued in the Hobart mixer until a dough state was reached. The dough was stored at about 50° F. for 25 days. At the end of this period no indication of spoilage was evident and after repeated rolling out, the dough maintained good sheet strength. The dough composition of this example is suitable for a pie dough or for other pastry dough applications.

EXAMPLE 2

A dough was formulated using the same technique as that used in Example 1. The dough composition was as follows:

| | Percent (by weight) |
|---|---|
| Wheat flour | 45.36 |
| Shortening (Crisco) | 34.04 |
| Water | 14.00 |
| Glycerol | 5.00 |
| Sodium chloride | 1.40 |
| Sodium benzoate | .20 |

This dough was stored for about 6 months at temperatures of 70° F. to 90° F. At the end of this period there was no evidence of spoilage.

EXAMPLE 3

Doughs were formulated according to the composition and using the technique of Example 1, but containing varying amounts of glycerol and calcium propionate. The days which the compositions could be kept without spoilage were as follows:

*Table I*

| | | Storage Temperature | | | |
|---|---|---|---|---|---|
| | | 50° F. | | 80° F. | |
| H₂O | Glycerol | Amount of Calcium Propionate Present | | Amount of Calcium Propionate Present | |
| | | 0.1% | 0.2% | 0.1% | 0.2% |
| 19% | 0% | 16 days | 52 days | 4 days | 4 days. |
| 16% | 3% | 48 days | 74 days | 16 days | 46 days. |
| 14% | 5% | 174 days | | 50 days | |

As is apparent, the number of days which the doughs could be stored without spoilage was substantially increased with glycerol present in the dough compositions.

EXAMPLE 4

Doughs weer formulated according to the composition and using the technique of Example 1, but with varying amounts of glycerol and water. These doughs were rated for rolling ease, stickiness, and sheet strength by five persons experienced in dough formulation and familiar with dough properties. Three dough samples were prepared at each glycerol-moisture level in the following table, and the five observers rated the indicated dough properties on a 1 to 5 scale. The results for the three samples were averaged. In the table a score of 1 was poor, 2 fair, 3 average, 4 good, and a score of 5 excellent.

*Table II*

| Concentration, percent | | Rolling Ease | Stickiness | Sheet Strength |
|---|---|---|---|---|
| H₂O | Glycerol | | | |
| 19 | 0 | 4.50 | 4.50 | 4.22 |
| 17 | 0 | 3.75 | 5.00 | 3.25 |
| 15 | 0 | 2.50 | 5.00 | 1.05 |
| 16 | 3 | 4.25 | 4.75 | 4.45 |
| 16 | 4 | 4.75 | 5.00 | 4.62 |
| 15 | 4 | 4.85 | 5.00 | 4.75 |
| 14 | 4 | 5.00 | 4.75 | 4.00 |
| 14 | 5 | 5.00 | 5.00 | 5.00 |

The doughs containing 3% to 5% glycerol were generally superior to those containing no glycerol. The glycerol-containing doughs handled and rolled out more easily, exhibiting good to excellent sheet strength after repeated rolling out.

Similar results are noted in dough compositions containing from about 1% glycerol to about 15% glycerol, about 10% to about 25% water, about 40% to about 55% flour, and about 20% to about 35% shortening, when the glycerol to water ratio is from about 1:9 to about 3:2.

All of the doughs of this invention which are illustrated in the foregoing examples are excellent for use as pie doughs and for pastry doughs in general.

Although the present invention has been described and illustrated with reference to specific examples, it will be understood that modifications and variations can be made without departing from the spirit and scope of the invention.

What is claimed is:
1. A pastry dough composition consisting essentially of from about 1% to about 15% by weight glycerol, about 10% to about 25% by weight water, about 40% to about 55% by weight flour, and about 20% to about 35% by weight shortening, the glycerol to water ratio being from about 1:9 to about 3:2.
2. The pastry dough composition of claim 1 which contains from about .03% to about .3% by weight of an edible preservative.
3. The pastry dough composition of claim 2 in which the edible preservative is calcium propionate.
4. The pastry dough composition of claim 1 which contains about 45% to about 50% by weight flour, about 14% to about 18% by weight water, about 29% to about 35% by weight shortening, and about 1% to about 5% by weight glycerol.

References Cited by the Examiner

UNITED STATES PATENTS

| 2,731,350 | 1/1956 | Busch | 99—92 |
| 2,950,978 | 8/1960 | Milani | 99—85 X |
| 3,144,339 | 8/1964 | Dalby et al. | 99—91 |
| 3,149,979 | 9/1964 | Bohn | 99—94 |

A. LOUIS MONACELL, *Primary Examiner.*

RAYMOND N. JONES, *Examiner.*